United States Patent [19]

Banevicius

[11] Patent Number: 4,906,700

[45] Date of Patent: Mar. 6, 1990

[54] METHOD FOR PREPARING LOW ODOR POLYPHENYLENE ETHER RESIN INCLUDING SEPARATING, DISTILLING AND RECYCLING SOLVENT

[75] Inventor: John P. Banevicius, Slingerlands, N.Y.

[73] Assignee: General Electric Company, Selkirk, N.Y.

[21] Appl. No.: 291,562

[22] Filed: Dec. 29, 1988

[51] Int. Cl.$^4$ ............................................. C08G 65/44
[52] U.S. Cl. ...................................... 526/70; 526/67; 528/212
[58] Field of Search ...................... 526/70, 67; 528/212

[56] References Cited

U.S. PATENT DOCUMENTS

| | | | |
|---|---|---|---|
| 3,306,874 | 2/1967 | Hay | 260/47 |
| 3,306,875 | 2/1967 | Hay | 260/47 |
| 3,633,880 | 1/1972 | Newmark | 259/191 |
| 4,369,278 | 1/1983 | Kasahara et al. | 524/147 |
| 4,463,164 | 7/1984 | Dalton et al. | 526/70 |
| 4,556,699 | 12/1985 | Bialy et al. | 526/70 |

*Primary Examiner*—Harold D. Anderson
*Attorney, Agent, or Firm*—Hedman, Gibson, Costigan & Hoare

[57] ABSTRACT

Odoriferous by-product compounds, e.g. 2,4,6-trimethylanisole, are reduced in a process for the production of polyphenylene ether resin in liquid aromatic hydrocarbon solution by continuously distilling and recycling the aromatic hydrocarbon solvent.

9 Claims, 4 Drawing Sheets

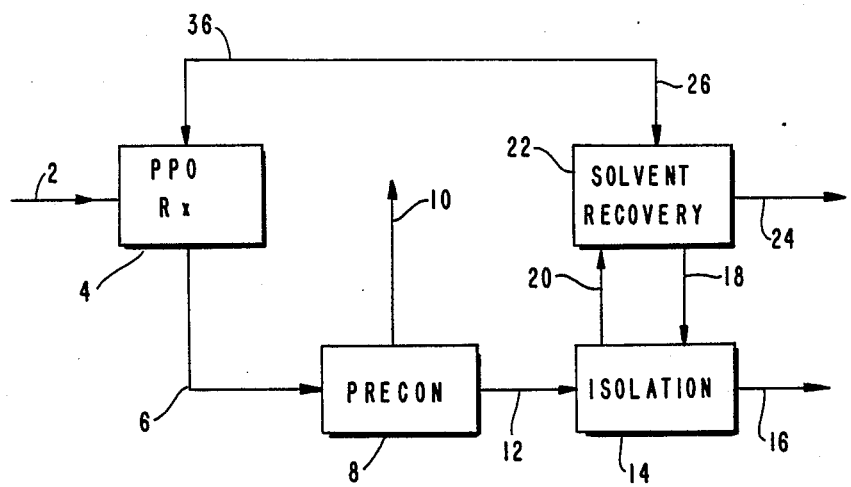
F I G. 4

METHOD FOR PREPARING LOW ODOR POLYPHENYLENE ETHER RESIN INCLUDING SEPARATING, DISTILLING AND RECYCLING SOLVENT

This invention relates to an improved process for producing low odor polyphenylene ether resin in which the toluene solvent recycle is distilled to reduce the content of existing odoriferous impurities.

BACKGROUND OF THE INVENTION

Polyphenylene ethers (also known as polyphenylene oxides) are a class of polymers widely used in industry, especially as engineering plastics in applications requiring toughness and heat resistance. In recent years there has developed an increasing interest in employing polyphenylene ethers in food packaging applications.

In many of these food packaging applications, it is essential that the polyphenylene ether be free from materials which are volatile, have undesirable odors or would otherwise harm the food. Various materials of this kind may be present in polyphenylene ether resins. They include dialkylamines such as di-n-butylamine, which are components of the catalyst used in the preparation of polyphenylene ethers as described hereinafter. Also present may be by-products formed in the synthesis of the substituted phenols from which the polyphenylene ethers are prepared. In the case of poly(2,6-dimethyl-1,4-phenylene ethers), these frequently include 2,4,6-trimethylanisole (2,4,6-TMA); 7-methyldihydrobenzofuran (7-MDBF); 2,3-dihydrobenzofuran; 2,6-dimethcyclohexanone and 2-ethylhex-2-enal. Removal of 2,4,6-trimethylanisole is particularly crucial because of its pronounced odor.

Conventionally, polyphenylene ether is manufactured by using a recycled liquid aromatic hydrocarbon solvent, which has a high concentration of odoriferous compounds, due to the continuous build up of impurities in the solvent, as compared to odoriferous concentrations in the polyphenylene ether monomer. A high concentration of odoriferous materials in the polyphenylene ether resin results, causing undesirable taste and odor and thus inhibiting the use of the resin in food contact applications, as little as 10 parts per million by weight can be detected by certain individuals with highly developed olfactory systems. Five parts per million and less are normally not detectable.

The issue of unpleasant odor associated with polyphenylene ether resin has been a longstanding problem with many plastics processors. Recently, extensive work has been carried out in order to reduce odor in polyphenylene ether resins. The primary area of focus of this work has been the removal of residual amines either by devolatilization during extrusion or post-extrusion extraction. See Kasahara et al., U.S. Pat. No. 4,369,278; Newmark, U.S. Pat. No. 3,633,880; Abolins and Hasson, U.S. patent application Ser. No. 210,733, filed Jun. 23, 1988, and Bopp, U.S. patent application Ser. No. 206,174, filed Jun. 13, 1988.

The present invention sets forth a method to produce a low odor polyphenylene ether resin in the initial production stage by reducing phenolic by-products of the monomer synthesis, such as 2,4,6-trimethylanisole and 7-methyldihydrobenzofuran, but not the reduction of residual amine components during post-production extrusion stages.

DESCRIPTION OF THE DRAWINGS

FIGS. 1 and 4 illustrate, in flow chart form, conventional processes for production of polyphenylene ether resin.

SUMMARY OF THE INVENTION

Figure 1:
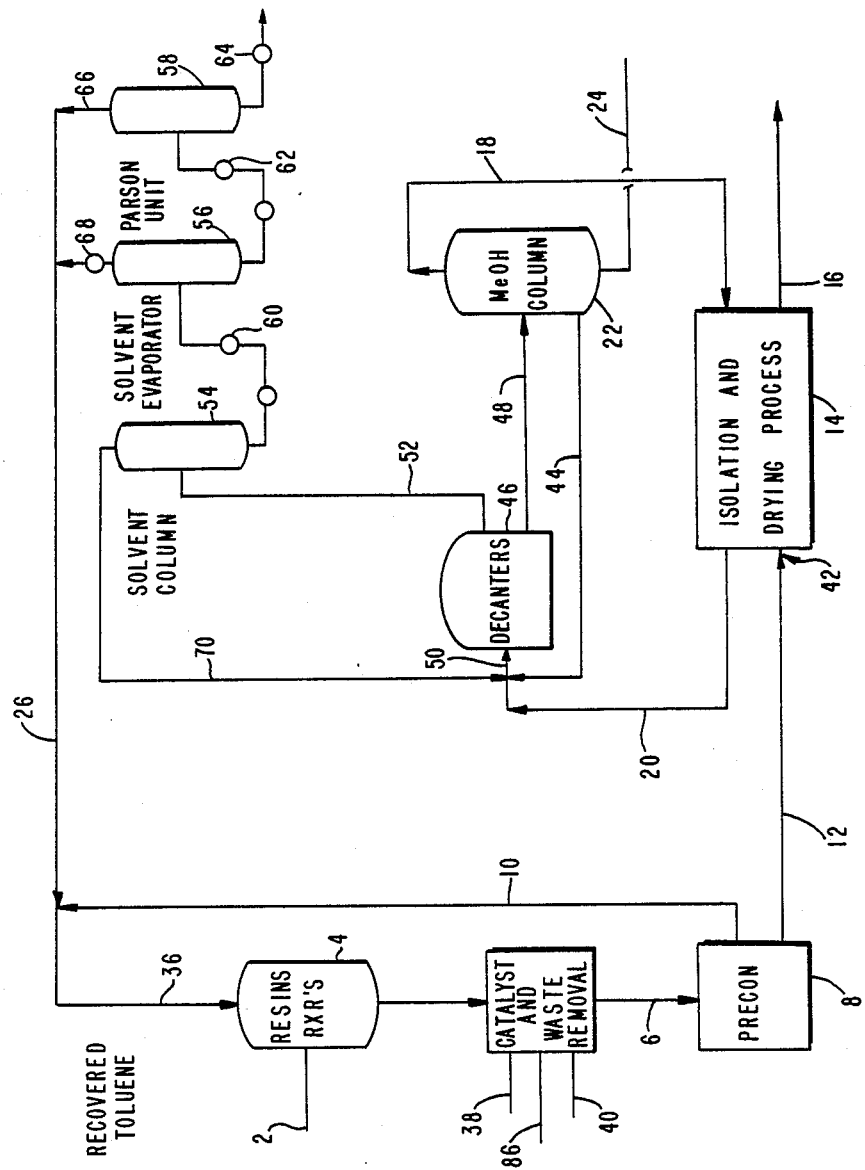

According to the present invention there are provided improved methods for continuously preparing a polyphenylene ether resin comprising oxidatively coupling a phenol with a catalyst in a solvent comprising a normally liquid aromatic hydrocarbon in a polymerization zone until formation of said resin and by-products are substantially complete and recovering said resin by addition of a $C_1$–$C_6$ alcohol to the polymer solution and recovering and recycling said aromatic hydrocarbon containing said by-products, in which the improvement comprises separating said aromatic hydrocarbon and said by-products and distilling to reduce the content of said by-products and thereafter recycling said aromatic hydrocarbon essentially free of by-product, to the polymerization zone.

Preferably, the polyphenylene ether comprises poly(2,6-dimethyl-1,4-phenylene ether), poly(2,6-dimethyl-co-2,3,6-trimethyl-1,4-phenylene ether) or a mixture thereof; the phenol feed into the reactor comprises 2,6-xylenol; the reaction solvent comprises toluene; the reaction catalyst comprises a complex copper amine; and the $C_1$ to $C_6$ alcohol comprises methanol.

Essential to the present invention is a distillation process to remove impurities from the toluene recycle. Preferably the distillation process comprises a distillation column of 45 sieve trays and reduces the 7-methyldihydrobenzofuran concentration to from about 0.5 to about 50 parts per million, and the 2,4,6-trimethylanisole concentration to from about 0 to about 5 parts per million in the distilled toluene recycle.

DETAILED DESCRIPTION OF THE INVENTION

The polyphenylene ethers to which the present invention is applicable are known in the art and are described in numerous publications including Hay, U.S. Pat. Nos. 3,306,874 and 3,306,875 and generally comprise a plurality of structural units having the formula

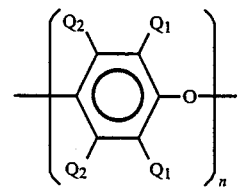

In each of said units independently, each $Q_1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined for $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or -4-methylpentyl and the corresponding heptyl groups. Examples of secondary lower alkyl groups are isopropyl, sec-butyl and 3-pentyl, Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents. The integer n is at least 50.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q_1$ is methyl and each $Q_2$ is hydrogen), whereupon the polymer may be characterized as a poly(2,6-dimethyl-1,4-phenylene ether), and 2,3,6-trimethylphenol (wherein each $Q_1$ and one $Q_2$ is methyl and the other $Q_2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, omega-hydroxyaromatic aldehydes, o-hydroxyazo compounds, beta-hydroxyoximes (monomeric and polymeric), o-hydroxyaryl oximes and β-diketones. Also useful are known cobalt-containing catalyst systems. Suitable manganese and cobalt-containing catalyst systems for polyphenylene ether preparation are known in the art by reason of disclosure in numerous patents and publications.

The odoriferous impurities, by-products of the monomer synthesis, such as 2,4,6-trimethylanisole and 7-methyldihydrobenzofuran are removed from the toluene recycle stream by distillation. The distillation may be performed in any suitable conventional distillation column. The recycle toluene stream is fed into a column shell comprising various plates or trays, which are used to bring the vapor and liquid phases of the feed material into intimate contact, stacked one above the other inside the enclosed column. The toluene solution is boiled and the pure toluene vapor is collected and condensed at the top of the column, while the impurities remain liquid and are collected at the bottom of the column. The number of trays necessary is dependent upon the degree of purity desired in the distillate and the type of tray used. Suitable for the practice of this invention are sieve type trays ranging from about 40 to about 65 in number.

Figure 3:
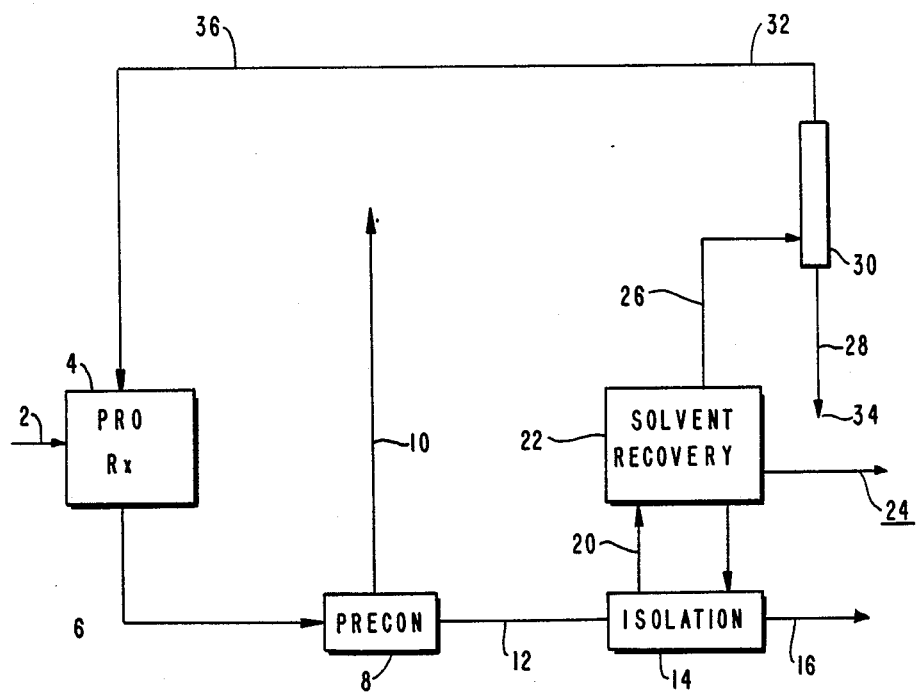

Distillation is carried out to render the recycle aromatic hydrocarbon essentially free of byproduct content. Essentially free is defined as the level of odoriferous impurities present in the recycle aromatic hydrocarbon such that recycling the aromatic hydrocarbon to the polymerization zone results in a very low odor product resin. Preferably, the 2,4,6-trimethylanisole content in the recycle aromatic hydrocarbon is reduced to less than about 5 parts per million and the 7-methyldihydrobenzofuran is reduced to less than about 50 parts per million. Referring to FIG. 3, a monomer 2 is put into solution with recycle toluene 36 and fed into reactor 4 where polymerization takes place. The polymer solution 6 is preconcentrated in vessel 8 wherein some of the toluene solvent is separated in stream 10. The preconcentrate is transported through conduit 12 into an isolation tank 14 where the resin is precipitated with methanol solvent introduced through inlet 18 to remove the remaining toluene. The polymer is dried and is removed through exit port 16 as low odor product resin. The toluene-methanol mixture is transferred through conduit 20 into solvent recovery system 22. Waste from recovery system 22 is removed through conduit 24. Recovered toluene is fed through conduit 26 into distillation column 30. The column bottoms waste are withdrawn through line 28 and merged with stream 24 and sent to process waste through conduit 34. The toluene distillate stream 32 is merged with previously separated toluene stream 10 to form purified recycle toluene which is returned through conduit 36 to reactor 4.

Figure 2:
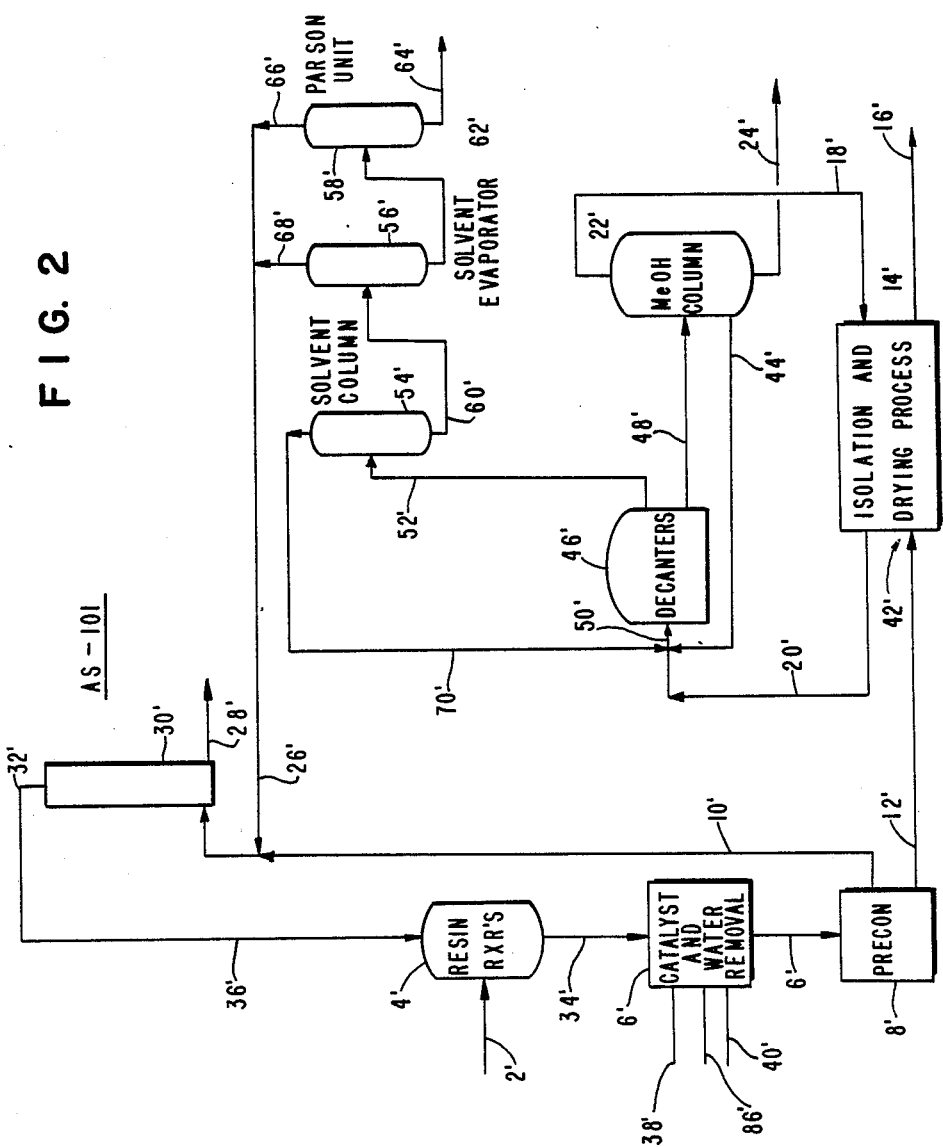
FIGS. 2 and 3 illustrate, in flow chart form, improved processes for production of low odor polyphenylene ether resin useful in carrying out the practice of this invention.

The flow diagram of FIG. 2 shows a similar, albeit more detailed, schematic of low odor PPE production; however, the stream comprising toluene recovered from the preconcentrator 10' and the stream comprising toluene recovered from the methanol 26' are merged before being fed into the recycle toluene purification distillation column instead of after. Only the recovered toluene stream 26 is distilled in FIG. 3.

For comparison purposes, in the conventional process for the production of PPE, referring to FIG. 1, a monomer 2 is put into solution with recycle toluene 36 and fed into reactor 4 where polymerization takes place. The polymer solution is then fed through conduit 5 into a catalyst and waste removal system 86 wherein the polymer solution is freed from catalyst and other impurities by the introduction of a "washing" liquid through conduit 38 which is then withdrawn through conduit 40. The polymer solution is then fed into a preconcentration vessel 8 through conduit 6, wherein some of the toluene solvent is separated and removed in conduit 10. The preconcentrate is transported through conduit 12 into an isolation and drying vessel 14, with emulsion water introduced through conduit 42. In the isolation and drying vessel, the resin is precipitated with methanol solvent introduced through conduit 18 to remove the remaining toluene. The polymer resin is dried and removed through exit conduit 16 as product resin. The toluene-methanol mixture is removed through conduit 20 where it joins with conduits 70 and 44 to form conduit 50 and is fed into decanter vessel 46 wherein a portion of the toluene is separated from the methanol. The methanol fraction is removed from the decanter vessel through conduit 48 and is fed into methanol distillation column 22. The purified methanol is taken from the top of the column 22 through conduit 18 for feeding into the isolation and drying process. Waste from the column 22 is removed from the bottom as blowdown 24. Extraction water from the column 22 is removed in conduit 44 and joined with conduit 20. The toluene fraction from the decanter 46 is removed through conduit 52 and fed into solvent column 54. Methanol which was remaining in the toluene fraction is removed from the solvent column 54 top through conduit 70 and later joined with conduit 20. The solvent column 54 bottoms are fed through conduit 60 into solvent evaporator 56. Purified toluene is removed from the evaporator 56 top through conduit 68. Evaporator 56 bottoms exit through conduit 62 and are fed into Parkson unit 58. Parkson bottoms are removed through conduit 64 and toluene recovered from the Parkson unit 58 is transported through conduit 66 and joins with conduit 68 to form conduit 26 containing purified toluene. Conduit 26 later combines with toluene conduit 10 from the preconcentrator 8 to form recycle toluene conduit 36.

FIG. 2 shows a similar production process, except that after conduits 26' and 10' join they are fed into another column 30' for further purification. The column bottoms are transported through conduit 28' to Parkson bottoms and the recovered toluene is transported through conduit 32' to form purified recycle toluene conduit 36'.

The additional distillation purification of the recycle toluene results in substantially lower amounts of odoriferous impurities in the final resin product, resulting in the production of low odor resin.

DESCRIPTION OF PREFERRED EMBODIMENTS

The following examples illustrate the present invention. They are not to be construed to limit the claims in any manner whatsoever.

EXAMPLE 1

A solution of 2,6-xylenol monomer containing 500 parts per million of 2,4,6-trimethylanisole based on monomer dissolved in toluene is fed into a poly(2,6-dimethyl-1,4-phenylene ether) pilot plant as diagrammed in FIG. 3. The monomer is allowed to polymerize in toluene solution in the presence of oxygen and a complex copper amine catalyst to form a polymer/toluene solution. The catalyst is removed in a liquid-liquid counter-current extraction with nitrilotriacetic acid dissolved in water. The polymer is precipitated by addition of methanol and is collected as product. The resin contains only 25 parts per million by weight of 2,4,6-trimethylanisole. The toluene recovered from the methanol-toluene mixture in a solvent recovery unit is sent to a distillation column for purification and recycled to the polymerization zone. A control sample is similarly prepared except that the recycle toluene purification distillation column is omitted, as diagrammed in FIG. 4. This product, poly(2,6-dimethyl-1,4-phenylene ether) is analyzed for 2,4,6-trimethylanisole content and contains 300 parts per million by weight. The results, together with the distillation column specifications, are set forth in Table 1 below.

TABLE 1

| PPE 2,4,6-TMA CONTENT | | |
|---|---|---|
| Example | 1* | 1 |
| Distillation Column | | |
| Trays, number | — | 63 |
| Column diameter, ft. | — | 6 |
| Feed Rate, gpm | — | 140 |
| Bottoms Rate, gpm | — | 0.4 |
| Reflux Rate, gpm | — | 42 |
| 2,4,6-TMA conc. in distillate, ppm | — | 0 |
| PPE Properties | | |
| 2,4,6-TMA in a monomer feed, ppm | 500 | 500 |
| 2,4,6-TMA in product resin, ppm | 300 | 25 |

*Control Sample

The above table clearly shows a vast reduction in the amount of odoriferous 2,4,6-trimethylanisole present in the poly(2,6-dimethyl-1,4-phenylene ether) produced with a purified toluene solvent as compared to only a slight reduction of 2,4,6-trimethylanisole content in poly(2,6-dimethyl-1,4-phenylene ether) produced with an unpurified toluene recycle.

EXAMPLE 2

The procedure of Example 1 is repeated using a different distillation column and combining the preconcentrator recycle stream to the distillation feed stream along with the toluene recycle recovered from separation with methanol, see FIG. 2. A control sample is similarly prepared except that the recycle toluene purification distillation column is omitted. The product PPE is tested for 2,4,6-TMA content and the results are set forth in Table 2 together with the distillation column specifics.

TABLE 2

| PPE 2,4,6-TMA CONTENT - COMBINED RECYCLE | | |
|---|---|---|
| Example | 1* | 1 |
| Distillation Column | | |
| Trays, sieve, # | — | 45 |
| 2,4,6-TMA conc. in distillate, ppm | — | 5 |
| PPE Properties | | |
| 2,4,6-TMA in a product resin, ppm | 200 | 35 |

The above table clearly shows that purification of the toluene recycle stream results in a very substantial reduction in the 2,4,6-trimethylanisole content in the PPE product resin as opposed to PPE product resin where the toluene recycle is not purified.

The above-mentioned patents, patent applications and, publications are incorporated herein by reference.

Many variations of the present invention will suggest themselves to those skilled in this art in light of the above detailed description. For example, instead of poly(2,6-dimethyl-1,4-phenylene ether); poly(2,6-dimethyl- co-2,3,6-trimethyl-1,4-phenylene ether) or a mixture thereof may be produced. Instead of using 2,6-xylenol monomer feed, a different monohydroxyaromatic compound such as 2,3,6-trimethylphenol may be used.

The catalyst and catalyst removal compounds may also be modified. Instead of using a complex copper amine catalyst, a variety of other heavy metal catalysts complexes may be used such those based on manganese or cobalt. Normally liquid aromatic hydrocarbons such as benzene, o-, m- and p-xylene, dodecylbenzene, dinonylnaphthalene, mixtures of any of the foregoing and the like can be used.

All such other obvious modifications are within the full intended scope of the appended claims.

I claim:

1. In a continuous process for the preparation of a polyphenylene ether resin comprising oxidatively coupling a phenol with a catalyst in a solvent comprising a normally liquid aromatic hydrocarbon in a polymerization zone until formation of said resin and by-products are substantially complete and recovering said resin by addition of a $C_1$-$C_6$ alcohol to the polymer solution and recovering and recycling said aromatic hydrocarbon containing said by-products, the improvement which comprises separating said aromatic hydrocarbon and said by-products by distilling to reduce the content of said by-products and thereafter recycling said aromatic hydrocarbon essentially free of by-products to the polymerization zone.

2. A process as defined in claim 1 wherein the polyphenylene ether comprises poly(2,6-dimethyl-1,4-phenylene ether), poly(2,6-dimethyl-co-2,3,6-trimethyl-1,4-phenylene ether) or a mixture thereof, said liquid aromatic hydrocarbon comprises toluene and said $C_1$-$C_6$ alcohol comprises methanol.

3. A process as defined in claim 1 wherein said phenol fed into the reactor comprises 2,6-xylenol.

4. A process as defined in claim 1 wherein said catalyst comprises a complex metal amine catalyst.

5. A process as defined in claim 4 wherein said complex metal amine catalyst comprises a copper amine catalyst.

6. A process as defined in claim 2 wherein said recycled toluene is distilled in a distillation column comprising 45 sieve trays.

7. A process as defined in claim 1 wherein said polymerization is carried out to form a polyphenylene ether resin comprising at least about 50 repeating units.

8. The process as defined in claim 1 wherein said improvement comprises distilling said aromatic hydrocarbon and said by-products to reduce the content of 2,4,6-trimethylanisole in said aromatic hydrocarbon to less than about 5 parts per million by weight based on said aromatic hydrocarbon.

9. The process as defined in claim 1 wherein by-product 7-methyldihydrobenzofuran (7-MDBF) in said polyphenylene ether resin is reduced to a range of from about 0.5 to about 50 parts per million.

* * * * *